Jan. 3, 1961  J. J. WEIER  2,966,932
TRACTION DEVICES
Filed Dec. 14, 1959  2 Sheets-Sheet 1

INVENTOR.
Jacob Weier.
BY
Joseph B. Lindecker.
Attorney.

Jan. 3, 1961
J. J. WEIER
2,966,932
TRACTION DEVICES
Filed Dec. 14, 1959
2 Sheets-Sheet 2
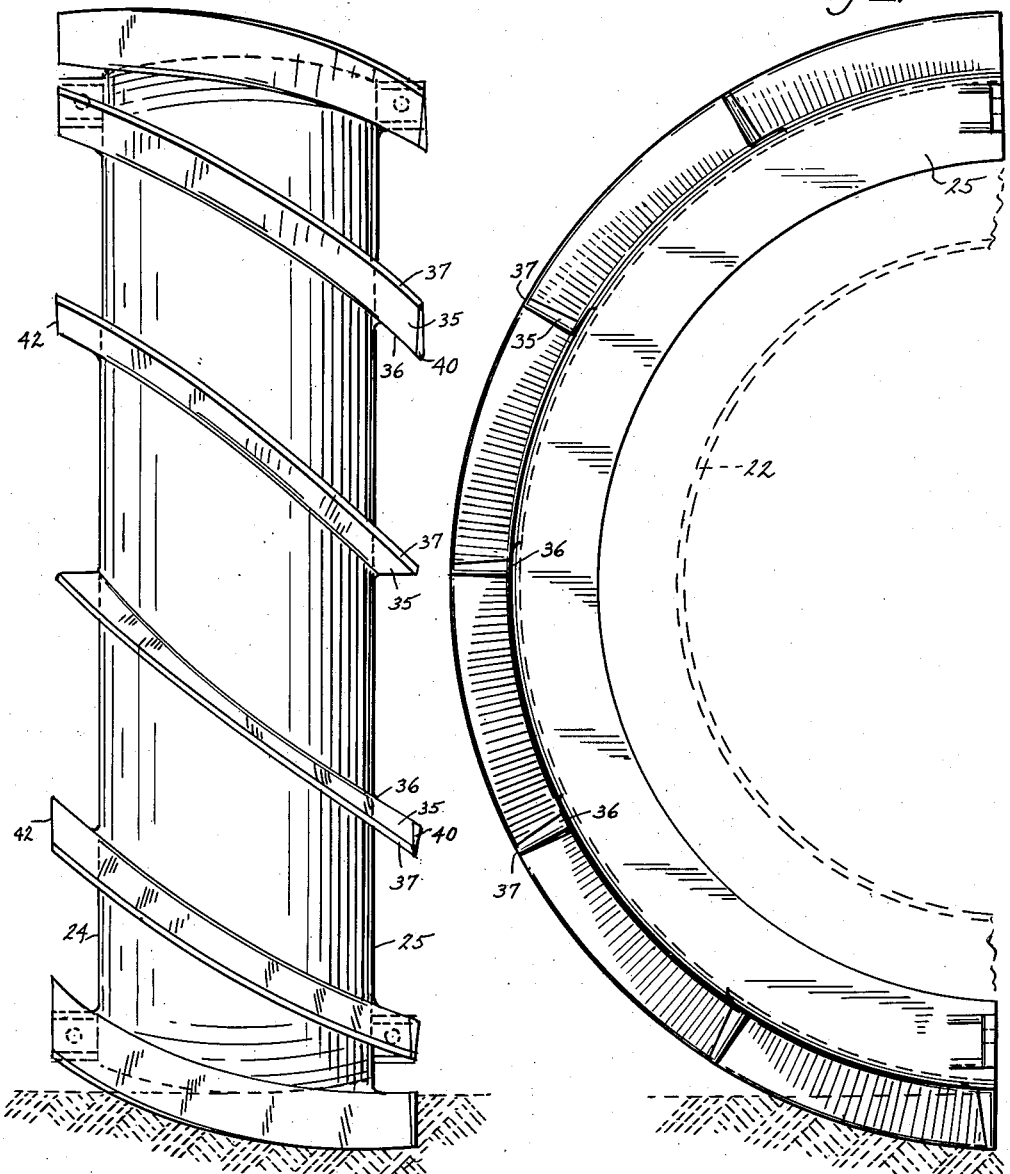
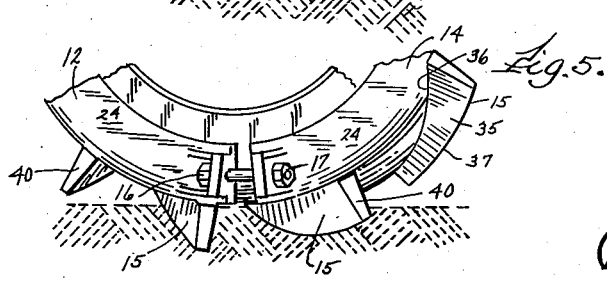
INVENTOR.
Jacob Weier,
BY
Joseph B. Lindecker.
Attorney.

United States Patent Office 2,966,932
Patented Jan. 3, 1961

2,966,932

TRACTION DEVICES

Jacob J. Weier, 10611 S. Sawyer Ave., Chicago, Ill.

Filed Dec. 14, 1959, Ser. No. 859,435

4 Claims. (Cl. 152—182)

This invention relates to a traction device and, more particularly, an attachment for large pneumatic tires on the driving wheels of motor vehicles, such as trucks, farm tractors or jeeps, which shall be driven on soft or muddy ground.

The main object of the invention resides in the provision of a device of this character made of sheet metal which may be readily secured around a large pneumatic tire to provide increased traction means and to afford protection for the tires.

Another object of this invention is to provide a traction device for a large pneumatic tire which will remain on the tire even though the tire be subjected to a very strong side thrust, which tends to dislodge the tire from the wheel.

Another object of this invention is to increase the frictional engagement between large pneumatic tires on wheels and the soil, to provide a device which consists essentially of two semi-circular complementary members having means for operatively associating with the tires in a removable manner, to provide a device with obliquely extending ribs or cleats, spaced parellel with each other and integrally formed upon the exterior surface thereof, the ribs or blades cutting grooves in the soil in the driving direction whereby the wheels and tires thereon are secured against sliding in lateral direction, thereby to secured a rolling movement of the tires and wheels without the losses of speed and of energy resulting from sliding movement, to avoid excavations of the soil and digging of the tires into the soil by such sliding or slipping movements, and to secure a safe propulsion and steerage of the motor vehicle under all circumstances.

An important object of this invention is to provide a device to protect large straight wall pneumatic tires on trucks from damage by hard ingredients or projections of the soil, to space these tires from the ground, and to provide tires with semi-circular lamellas having large surfaces fitting the outer curvature of the tires and adjacent side wall portions thereof whereby these semi-circular lamellas form protective shields and do not impress or damage the tires.

Heretofore traction devices have been made from forgings and castings. These forgings and castings are solid members and are quite heavy. Excess weight is objectionable, especially with semi-circular devices coming into use at the present time.

Traction devices are often subjected to impact and bending stresses. Cast and forged metals have low resistance to impact and bending stresses due to the characteristics of cast and forged metals. It order to obtain the strength required to produce satisfactory cast or forged traction devices sufficient metal has been put into the device to give the desired strength. This has resulted in excessively heavy traction semi-circular units.

This invention is made of sheet metal formed in stamping processes with ribs which are later welded integrally therewith. The expensive machining processes required on cast and forged traction devices are eliminated by this invention.

Further objects of this invention are therefore to provide a traction device that provides the greatest possible strength per semi-circular unit and per unit area of the cross section.

A still further object of this invention is to provide a traction device that is adapted to quantity production and inexpensive, and which allows the exterior surface thereof to be covered with wax or the like whereby the mud cannot cling thereto as it will slide therefrom.

These and further objects of my invention will be set forth in the following specification, reference being had to the accompanying drawings, and the novel means to which said objects are effectuated will be definitely pointed out in the claims.

In the drawings:

Figure 3 is a vertical front elevational view of the improved traction device shown by Fig. 1 with the entire combination under load and showing a cleat thereof embedded in the soil;

Figure 4 is a fragmentary side elevational view of the improved traction device shown by Fig. 3, showing one semi-circular unit thereof, with the combination under load; and Figure 5 is a fragmentary perspective view of the improved traction device shown in Figures 3 and 4, showing the obliquely arranged cleats, or cross blades, cutting into the soil, with the combination under load.

Off-the-highway vehicles use large pneumatic tires for the two-fold purpose of carrying the load and providing a large supporting area for operation where ground support conditions are poor, such as in sand and mud. With the increasing use of greater power for driving such vehicles, it becomes necessary to increase the traction effect of such tires in order to handle the load involved. In order to gain an increased measure of tractive effect, the present invention applies a metallic traction device embodying two semi-circular sections bolted together and each curved longitudinally and transversely and each provided on its outer side with parallel, spaced, oblique traction members integrally welded thereto. The most practical type traction device for the above use from the standpoint of efficiency in propelling the vehicle forward and yet provide adequate support for heavy loads under adverse ground conditions, is a dual unit in which each section is semi-circular in length in the direction in which the tire travels, being U-shaped in cross-section and having ground gripping and cutting blades welded thereto to extend radially outward from the circumference of the section to gain a sufficient grip into the ground. Most traction devices are difficult to apply; especially the common multiple section grouser type track. The semi-circular, dual unit of this invention is less difficult to apply, one section is applied to the forward exposed half of the tire, the vehicle is then moved forwardly so that the lower half of the entire tire is supported in the section, the upper semi-circular section is then applied to the upper half of the entire tire and then bolted to said lower semi-circular section. The upper and lower sections are U-shape in cross-section so that they firmly engage the tire at all times, so that the tire does not creep within the traction device and so wear the rubber tread of the tire. The flat sides of the U-shaped section are in juxtaposition with the flat side walls of the tire and enclose the upper semi-circular exterior portion of the tire.

The manner of accomplishing the foregoing objects as well as further objects and advantages, will be made manifest in the following description.

Figure 2:
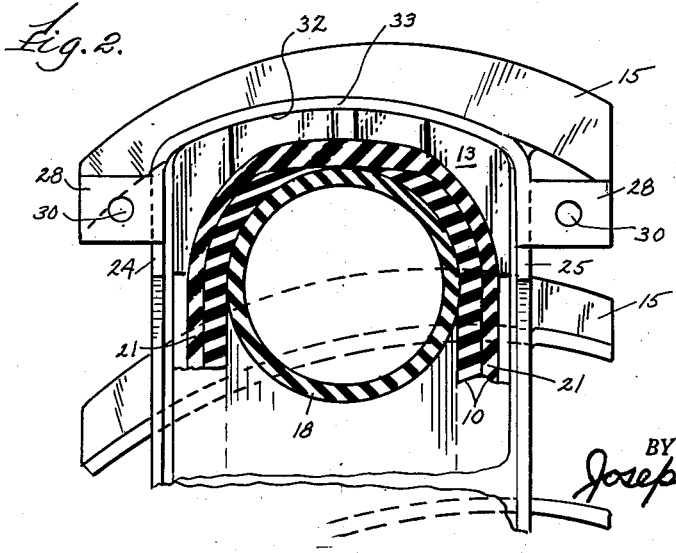
Figure 2 is a fragmentary transverse sectional view taken along the line 2—2 of Fig. 1.

The tire 10 illustrated herein is of the character that usually has inner tubes and has been shown by Fig. 2 as using a tube 18.

The traction device of this invention comprises two semi-circular, substantially identical, channel sections 12 and 14 embodying rigid cleats 15 welded thereon. The channel sections 12 and 14 are made of sheet metal formed in stamping processes; the cleats are made of iron, or the like, and integrally welded to the road surface portion of each channel section, thereby eliminating expensive machining processes usually required on cast and/or forged traction devices. Each of these channel sections is clearly shown in Fig. 1. One complete channel section is clearly shown by Figures 3 and 4. Each channel section can be referred to as a semi-circular, metallic casing of substantially U-shaped configuration in cross section.

The channel sections consist of sections 12 and 14 which are transversely shaped to conform to the shape of the tire 10 and rubber cleats 13 thereon, and when joined together by bolts 16 and nuts 17 they form an annulus which entirely surrounds the tread and approximately one-half the side wall area of the tire; the upper area 20 of the tire 10 enclosed, while the lower area 21 adjacent the rim 22 of the wheel 23 is uncovered. Each tire 10 embodies an inner tube 18 therein. Each of the channel sections is provided upon opposite sides 24 and 25 adjacent their ends 26 and 27 with laterally extending lugs 28 and 29, integrally welded thereto, provided with a central bore 30 extending therethrough, through which bolts 16 pass. When the channel sections are assembled on a tire, the bolts 16 are inserted through the bores 30 in each pair of lugs 28 and each pair of lugs 29 and nuts 17 are screw-threaded upon the threaded ends of the bolts 16, whereby the channel sections are assembled and held in position upon the tire 10. By Figure 2 the lower side walls 21 of the tires 10 extend vertically within the vertical side walls 24 and 25 of the channel sections. The rubber cleats 13 integrally formed with the exterior road gripping portion of the tire 10 fit within and in intimate contact with the inside surface 32 of the web portion 33 forming the closed portion of said channel members 12 and 14. Should the rubber cleats 13 be worn, or some extra space occur between the channel sections 12 and 14 and the tire 10, the inner concave surface of the sections are lined with felt or other cushioning material so as to supplement the spaces due to wear of tire in use.

Figure 1:
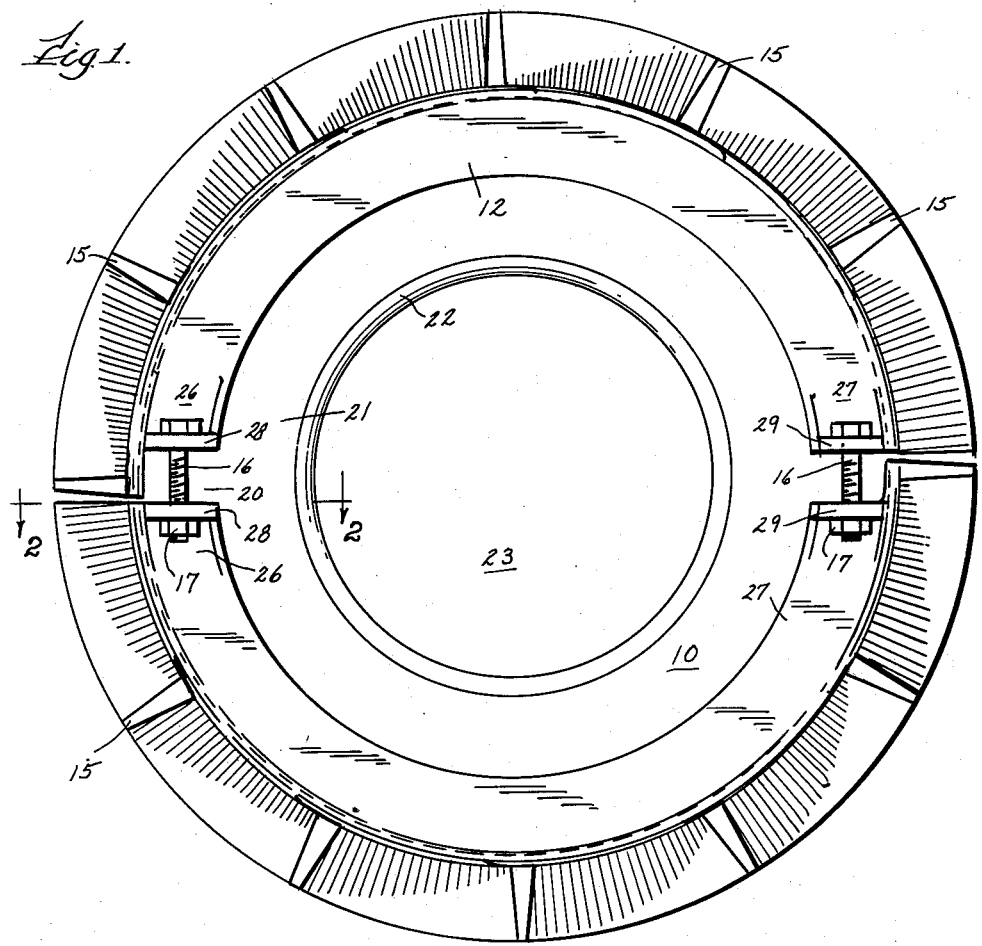
Figure 1 is a side elevational view showing a vehicle wheel and pneumatic tire with my improved traction device in position on the tire.

One of the novel features of the invention resides in the provision of parallel, spaced, oblique metal cleats 15 integrally welded to the convex surface of the channel sections 12 and 14. A plurality of cleats 15 are extended diagonally across each channel section and have their end portions extending a short distance beyond each side of the channel, the ends of the cleats 15 being in substantially longitudinal alignment with the ends of said lugs 28 and 29. As shown by Figures 1, 3 and 4 of the drawings, each channel section comprises six diagonal, parallel, spaced metal cleats 15. The cleats are characterized by being of concavo-convex curvature longitudinally, the radius of said longitudinal curvature being constant. The cleats are trapezoidal, or wedge-shaped in vertical section, constructed of hard metal such as special iron, or steel, the side walls 35 are tapered outwardly toward the base, thereby providing a thicker base surface 36 than the top surface 37 thereof. The cleats 15 are each a continuous, unbroken blade extending beyond each side of the channel section at approximately forty-five (45°) degrees relative to the longitudinal axis of the channel section. The far end 40 of each cleat 15 terminating at one side of the channel section is in transverse alignment with the near end 42 of the following cleat 15, whereby a smooth substantially continuous road contacting surface is provided as the weight of the load is transferred to each adjacent cleat 15 as the wheel turns. The cleats 15 are free of any longitudinal flanges whereby the cleats actually cut into the ground, not pressed all at one instant, and the ground, or soil, actually passes transversely between the cleats, no dirt ever clings to the channel sections between the cleats, clearly shown by Figure 5. The metal area upon the convex exterior surface between the cleats of each section is a closed, smooth surface, and being of smooth sheet metal with a polished surface, no mud ever clings thereto. It is clearly seen that the cleats are blades diagonally arranged, transversely curved with their base portions welded to the convex surface of the channel section, the interior surface of each section being concave to substantially coincide with the convex surface of the rubber cleats 13. The bolts and nuts secure the end portions of two semi-circular channel sections together, forming a single traction device formed from sheet metal with cleats and lugs welded thereto.

To prevent any mud from clinging to the smooth stamped surface while in use, the operator applies wax, or the like, to the ground contacting surface of the convex surface of the channel sections.

In the manufacture of my improved traction device the channel sections 12 and 14 are separately formed from individual blanks of predetermined size and shape in a plurality of stamping operations. The preformed metal cleats and lugs are welded to the channel sections while they are held in the proper position by a suitable fixture. The bolts and nuts are obtained from a suitable source and temporarily assembled with one of the sections for later use.

The cleats and lugs can also be secured to the channel sections by a brazing process instead of the welding process described above.

From the preceding description, it will be noted that each of my improved channel sections is composed of a stamping, stamped or pressed from a sheet metal blank. In this stamping or pressing process the fibers of the sheet metal are preserved, thus producing a channel section which preserves the strength of the sheet metal. The channel shape of each section also provides maximum strength. From the above description it is evident that my improved traction device is strong, and lighter in weight than cast metal castings.

While I have described one form of my invention, I do not wish to be limited to the particular form shown and described, as it is apparent to those skilled in the art that many modifications therein may be made without departing from the scope of the invention.

What I claim is:

1. A device for improving traction of a motor vehicle driving wheel having a pneumatic tire thereon, said pneumatic tire having a circumferential tread, said traction device comprising a pair of substantially identical detachable semi-circular, transversely U-shaped sheet, imperforated, rigid metal stampings, said sections having a smooth interior surface and correspondingly shaped lugs secured to the side wall portions thereof and adjacent the ends thereof, each of said lugs provided with a central bore for receiving bolt means, bolt means arranged within said central bores of each adjacent pair of lugs, said sections being adapted to be drawn firmly in contact with the tread of said pneumatic tire by said bolt means whereby the sections are prevented from slipping upon said tread, each of said sections having a plurality of substantially straight, parallel, diagonally spaced solid metal cleats of trapezoidal vertical cross-section integrally welded to its concavo-convex curvature circumferentially, the longitudinal length of each of said cleats being greater than the transverse width of said U-shaped channel sections, and said cleats extending outwardly beyond each side wall of said semi-circular, transversely U-shaped channel sections thereby giving sufficient traction with the ground adjacent the path travelled by said channel sections.

2. A device for improving traction of a motor vehicle driving wheel according to claim 1 wherein said cleats have a concavo-convex curvature longitudinally thereof and said cleats characterized by the curvature longitudinally at all points being of identical radius.

3. In combination with a vehicle wheel including a rim and a pneumatic tire on the rim, a traction device comprising a pair of sheet metal channel sections stamped from sheet metal blanks, each channel section being imperforated and semi-circular in circumferential configuration and U-shaped in transverse cross-section; each channel section being smooth on the interior and having lugs welded to the side walls thereof and adjacent each end thereof, said lugs formed with cylindrical bore extending therethrough, bolt means removably extending through the cylindrical bores of said lugs on adjacent ends of each channel section, said sections being adapted to be drawn firmly in contact with the tread and side portions of said pneumatic tire thereby providing vertical protective means for the side walls of said tire from mud and stones, a plurality of substantially straight, diagonally arranged, parallel metal cleats, said cleats being solid and integrally welded to the exterior surface of the closed bottom wall portion of said channel sections, and said cleats having a length greater than the width of said channel section and extending beyond the opposite sides thereof and outwardly from said lugs and bolt means whereby they effect greater traction by contacting the ground adjacent the normal path.

4. In combination with a vehicle wheel including a rim and a pneumatic tire on the rim, a traction device comprising a pair of identical sheet metal channel sections stamped from metal blanks, each channel section being imperforated and semi-circular in circumferential plain and U-shaped in transverse cross-section; each channel section being smooth and substantially free of inwardly projecting protuberances on the interior surface thereof, and smooth and free of outwardly projecting protuberances on the exterior surface thereof, the smooth exterior side walls having lugs welded thereto and adjacent each end thereof, said lugs formed with a cylindrical bore extending therethrough, bolt means removably extending through the cylindrical bores of said lugs on adjacent ends of each channel section, said sections being adapted to be drawn firmly in contact with the tread and side portions of said pneumatic tire thereby providing vertical protective means for the side walls of said tire from dirt, mud and stones, a plurality of substantially straight, diagonally arranged, parallel metal cleats, said cleats being solid and integrally welded to the smooth exterior surface of the closed bottom wall portion of said channel sections whereby the smooth exterior surface between said cleats prevents dirt and mud from accumulating therebetween, and said cleats having a length greater than the width of said channel section and extending a fair distance beyond the opposite sides thereof and outwardly from said lugs and bolt means, the outwardly extending end portions of said cleats solely supported by said channel sections and free of any interconnecting parts thereby preventing dirt from coating the cleats and accumulating and filling the space therebetween, whereby the normally substantially uncoated cleats effect traction by contacting the ground adjacent the normal path traveled by said channel sections and being the equivalent of a larger traction device.

References Cited in the file of this patent

UNITED STATES PATENTS

| | | |
|---|---|---|
| 1,037,677 | Smith | Sept. 3, 1912 |
| 1,344,853 | Belanger | June 29, 1920 |
| 1,385,159 | Stockham | July 19, 1921 |
| 2,353,916 | Mickelson | July 18, 1944 |
| 2,552,168 | Goolsby | May 8, 1951 |